United States Patent
Kongo

(10) Patent No.: US 9,957,651 B2
(45) Date of Patent: May 1, 2018

(54) SEWING DATA GENERATING APPARATUS, SEWING DATA GENERATING METHOD, RECORDING MEDIUM FOR STORING PROGRAM, AND SEWING SYSTEM

(71) Applicant: Janome Sewing Machine Co., Ltd., Tokyo (JP)

(72) Inventor: Takeshi Kongo, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 0 days. days.

(21) Appl. No.: 15/437,512

(22) Filed: Feb. 21, 2017

(65) Prior Publication Data

US 2017/0316590 A1    Nov. 2, 2017

(30) Foreign Application Priority Data

Apr. 28, 2016   (JP) .................................. 2016-091971

(51) Int. Cl.
| | | |
|---|---|---|
| D05C 5/02 | (2006.01) | |
| D05C 3/02 | (2006.01) | |
| D05C 11/06 | (2006.01) | |

(52) U.S. Cl.
CPC ................. *D05C 5/02* (2013.01); *D05C 3/02* (2013.01); *D05C 11/06* (2013.01); *G06T 2210/16* (2013.01)

(58) Field of Classification Search
CPC ........ D05B 19/08; D05B 19/10; D05B 19/12; D05B 19/16; D05B 19/02; D05C 5/02
USPC .................................................. 700/136–138
See application file for complete search history.

(56) References Cited

U.S. PATENT DOCUMENTS

| | | | | | |
|---|---|---|---|---|---|
| 4,998,489 | A | * | 3/1991 | Hisatake ................ | D05B 19/08 112/103 |
| 5,323,722 | A | * | 6/1994 | Goto .................. | G05B 19/4205 112/102.5 |
| 5,855,176 | A | * | 1/1999 | Takenoya ............... | D05B 19/08 112/102.5 |
| 5,911,182 | A | * | 6/1999 | Uyama ................ | D05B 19/085 112/102.5 |

(Continued)

FOREIGN PATENT DOCUMENTS

| | | |
|---|---|---|
| JP | H05-048875 U | 6/1993 |
| JP | 2014-64660 A | 4/2014 |

*Primary Examiner* — Danny Worrell
(74) *Attorney, Agent, or Firm* — Nakanishi IP Associates, LLC

(57) ABSTRACT

A sewing data generating unit acquires embroidery frame information and a mark alignment region displayed on a display unit for guiding multiple marks that define an embroidery region of the embroidery frame. When the marks are all positioned within the mark alignment region displayed on the display unit, the sewing data generating apparatus acquires an image of the embroidery frame and a sewing target mounted on a base cloth mounted on the embroidery frame. The sewing data generating apparatus performs image analysis based on a correspondence between the acquired information with respect to the embroidery frame and the marks in the acquired image, so as to determine the embroidery region of the embroidery frame. The sewing data generating apparatus generates outline data for the sewing target based on the determined embroidery region. This allows an applique to be sewn at an accurate position without a need to prepare dedicated data.

14 Claims, 21 Drawing Sheets

(56) References Cited

U.S. PATENT DOCUMENTS

| | | | | |
|---|---|---|---|---|
| 6,263,815 B1* | 7/2001 | Furudate | D05B 7/00 112/470.13 |
| 8,061,286 B2* | 11/2011 | Hirata | D05C 5/04 112/102.5 |
| 8,091,493 B2* | 1/2012 | Tokura | D05B 19/10 112/470.01 |
| 8,301,292 B2* | 10/2012 | Tokura | D05C 5/06 112/470.03 |
| 8,527,083 B2* | 9/2013 | Tokura | D05B 19/10 112/102.5 |
| 8,738,173 B2* | 5/2014 | Tokura | D05B 19/10 700/138 |
| 8,755,926 B2* | 6/2014 | Naka | D05B 19/12 112/470.03 |
| 8,763,541 B2* | 7/2014 | Tokura | D05C 5/06 112/102.5 |
| 8,763,542 B2* | 7/2014 | Abe | D05B 19/04 112/102.5 |
| 8,857,355 B2* | 10/2014 | Nomura | D05B 19/12 112/470.06 |
| 8,948,901 B2* | 2/2015 | Tokura | D05B 19/08 112/102.5 |
| 9,169,588 B2* | 10/2015 | Tokura | D05B 19/12 |
| 9,249,533 B2* | 2/2016 | Imaizumi | D05B 19/10 |
| 9,267,222 B2* | 2/2016 | Schnaufer | D05B 19/12 |
| 9,765,460 B2* | 9/2017 | Schwarzberger | D05B 19/08 |
| 2008/0247651 A1* | 10/2008 | Takaki | G06K 9/4671 382/219 |
| 2009/0188413 A1* | 7/2009 | Hirata | D05B 19/10 112/103 |
| 2009/0188414 A1* | 7/2009 | Tokura | D05B 19/10 112/457 |
| 2014/0000498 A1* | 1/2014 | Yamanashi | D05B 19/12 112/102.5 |
| 2014/0083345 A1 | 3/2014 | Tokura | |
| 2015/0005921 A1* | 1/2015 | Abe | D05B 19/08 700/138 |

* cited by examiner

SEWING DATA GENERATING APPARATUS, SEWING DATA GENERATING METHOD, RECORDING MEDIUM FOR STORING PROGRAM, AND SEWING SYSTEM

CROSS REFERENCE TO RELATED APPLICATIONS

This application is based on and claims the benefit of priority to Japanese Patent Application No. 2016-091971 filed on Apr. 28, 2016, the contents of which are hereby incorporated by reference in their entirety.

BACKGROUND OF INVENTION

Field of the Invention

The present invention relates to a sewing data generating apparatus, a sewing data generating method, a recording medium for storing a program, and a sewing system.

Description of the Related Art

A sewing machine is known, having a function of providing applique based on applique embroidery data. For example, such applique embroidery data is prepared including multiple kinds of applique stitching patterns. First, the user stretches an applique cloth material over an embroidery frame mounted on a sewing machine. In this state, the sewing machine forms a stitching pattern based on the first data such that it functions as a mark for cutting an applique cloth from the applique cloth material. Next, the user mounts a base cloth on the embroidery frame. In this state, the sewing machine forms stitching based on the second data such that it functions as a mark for position alignment between the applique cloth and the base cloth. After the user accurately cuts the applique cloth from the applique cloth material, the user temporarily bonds the applique cloth to the base cloth using an adhesive or the like such that it is located at a position indicated by the stitching formed as a mark on the base cloth. Lastly, the sewing machine sews the applique cloth to the base cloth based on the first data. Such a technique has been disclosed, which allows a sewing machine to provide applique sewing (see Patent document 1, for example).

Also, another technique has been disclosed (see Patent document 2, for example). That is to say, instead of forming such stitching on the base cloth for position alignment, a small alignment mark is placed on the applique cloth after the applique cloth has been temporarily bonded to the base cloth. In this state, a camera mounted on a sewing machine acquires an image of the applique cloth and the mark, and calculates the position and the angle of the mark based on the image data. Next, the third data to be used by the user to perform applique sewing is corrected based on the position and the angle of the mark. That is to say, the third data is converted such that the position of the applique cloth matches the position indicated by the third data. This allows the sewing machine to sew the applique cloth to the base cloth.

RELATED ART DOCUMENTS

Patent Documents

[Patent Document 1]
 Japanese Patent Application Laid-Open No. H05-48875
[Patent Document 2]
 Japanese Patent Application Laid-Open No. 2014-64660
However, with the techniques described in Patent documents 1 and 2, such an arrangement requires dedicated embroidery data to be prepared beforehand. This leads to an issue in that the applique is limited to the patterns prepared beforehand.

That is to say, with the technique described in Patent document 1, such an arrangement requires the first data that provides a mark for cutting an applique from an applique cloth material, the second data used for alignment of the applique cloth, and the third data used to sew the applique cloth to the base cloth.

Furthermore, with the technique described in Patent document 2, such an arrangement requires the first data that provides a mark used for cutting an applique from an applique cloth material and the third data used to sew the applique cloth to the base cloth. Furthermore, such an arrangement requires the user to accurately cut the applique cloth from the applique material cloth. In a case in which the user desires an applique having a different shape, the user must generate (input) new dedicated data again.

Moreover, with the techniques described in Patent documents 1 and 2, in a case in which an applique cloth cut in a user's desired shape is sewn to a base cloth, the user must use a zig-zag stitching function or an over-edge stitching function supported by an ordinary sewing machine instead of the function of an embroidery sewing machine. That is to say, in this case, the user must perform zig-zag stitching or over-edge stitching in a state in which the user holds the cloth by hand while delicately adjusting the sewing direction along the entire outline of the applique cloth.

SUMMARY OF THE INVENTION

Accordingly, the present invention has been made in order to address the aforementioned issue. It is a purpose of the present invention to provide a sewing data generating apparatus, a sewing data generating method, a recording medium for storing a program, and a sewing system, configured to allow an applique to be accurately sewn at a given position without a need to prepare dedicated data beforehand.

Embodiment (1)

One or more embodiments of the invention provide a sewing data generating apparatus. The sewing data generating apparatus comprises: an embroidery frame information acquisition unit that acquires information with respect to an embroidery frame and information with respect to a mark alignment region displayed on a display unit for guiding a plurality of marks provided to the embroidery frame for defining an embroidery region of the embroidery frame; an image acquisition unit that acquires an image of the embroidery frame and a sewing target mounted on a base cloth mounted on the embroidery frame when all the plurality of marks are aligned within the mark alignment region in an image displayed on the display unit; an acquired image analyzing unit that performs image analysis for the plurality of marks in the image acquired by the image acquisition unit based on a correspondence with the information with respect to the embroidery frame acquired by the embroidery frame information acquisition unit; an embroidery region determination unit that determines the embroidery region of the embroidery frame based on an analysis result obtained by the acquired image analyzing unit; and an outline data generating unit that generates outline data of the sewing target based on the embroidery region thus determined.

Embodiment (2)

One or more embodiments of the invention provide the sewing data generating apparatus comprising a sewing data generating unit that generates sewing data for the sewing target based on the outline data generated by the outline data generating unit.

Embodiment (3)

One or more embodiments of the invention provide the sewing data generating apparatus comprising a transmission unit that transmits the sewing data, which is generated by the sewing data generating unit for the sewing target, to a sewing machine.

Embodiment (4)

One or more embodiments of the invention provide the sewing data generating apparatus comprising an operation instructing unit that calls attention to inputting a positioning instruction for the embroidery frame such that the plurality of marks displayed on the display unit are all positioned within the mark alignment region.

Embodiment (5)

One or more embodiments of the invention provide the sewing data generating apparatus. The operation instructing unit provides at least one from among a guidance display and an audio guidance.

Embodiment (6)

One or more embodiments of the invention provide the sewing data generating apparatus comprising a gravity direction detection unit that detects a gravity direction. The display unit further displays an image acquisition orientation guidance display for guiding an alignment between an image acquisition optical axis of the image acquisition unit and the gravity direction based on a detection result obtained by the gravity direction detection unit.

Embodiment (7)

One or more embodiments of the invention provide the sewing data generating apparatus. When the plurality of marks are aligned within the mark alignment region and when judgment has been made based on the detection result obtained by the gravity direction detection unit that the image acquisition optical axis aligns with the gravity direction, the image acquisition unit automatically performs image acquisition.

Embodiment (8)

One or more embodiments of the invention provide the sewing data generating apparatus comprising a correction unit configured such that, when there is an inclination between the display unit and the embroidery region thus determined in the image acquired by the image acquisition unit, the inclination is corrected.

Embodiment (9)

One or more embodiments of the invention provide the sewing data generating apparatus. The acquired image analyzing unit performs thinning image processing on the image of the plurality of marks thus acquired. The embroidery region determination unit determines the embroidery region based on the plurality of marks thus subjected to the thinning image processing.

Embodiment (10)

One or more embodiments of the invention provide the sewing data generating apparatus comprising a sewing data confirmation unit that instructs the display unit to display an image of the sewing target acquired by the image acquisition unit and a planned sewing line generated based on the sewing data generated by the sewing data generating unit.

Embodiment (11)

One or more embodiments of the invention provide the sewing data generating apparatus. The sewing data confirmation unit displays the planned sewing line in a color that can be easily identified visually with respect to colors in the image including the sewing target.

Embodiment (12)

One or more embodiments of the invention provide the sewing data generating apparatus comprising an editing unit that edits the outline data according to an operation by a user.

Embodiment (13)

One or more embodiments of the invention provide a sewing data generating method. The sewing data generating method comprises: acquiring, by an embroidery frame information acquisition unit, information with respect to an embroidery frame and information with respect to a mark alignment region displayed on a display unit for guiding a plurality of marks provided to the embroidery frame for defining an embroidery region of the embroidery frame; acquiring, by an image acquisition unit, an image of the embroidery frame and a sewing target mounted on a base cloth mounted on the embroidery frame when the plurality of marks displayed on the display unit are all positioned within the mark alignment region; performing image analysis by an acquired image analyzing unit for the plurality of marks in the image acquired by the image acquisition unit based on a correspondence with the information with respect to the embroidery frame acquired by the embroidery frame information acquisition unit; determining, by an embroidery region determination unit, the embroidery region of the embroidery frame based on an analysis result obtained by the acquired image analyzing unit; and generating, by an outline data generating unit, outline data of the sewing target based on the embroidery region thus determined.

Embodiment (14)

One or more embodiments of the invention provide a recording medium for storing a program that instructs a sewing data generating apparatus to execute a sewing data generating method. The sewing data generating method comprises: acquiring, by an embroidery frame information acquisition unit, information with respect to an embroidery frame and information with respect to a mark alignment region displayed on a display unit for guiding a plurality of marks provided to the embroidery frame for defining an embroidery region of the embroidery frame; acquiring, by an image acquisition unit, an image of the embroidery frame and a sewing target mounted on a base cloth mounted on the embroidery frame when the plurality of marks displayed on the display unit are all positioned within the mark alignment region; performing image analysis by an acquired image analyzing unit for the plurality of marks in the image acquired by the image acquisition unit based on a correspondence with the information with respect to the embroidery frame acquired by the embroidery frame information acquisition unit; determining, by an embroidery region determination unit, the embroidery region of the embroidery frame based on an analysis result obtained by the acquired image analyzing unit; and generating, by an outline data generating unit, outline data of the sewing target based on the embroidery region thus determined.

Embodiment (15)

One or more embodiments of the invention provide a sewing system comprising a sewing data generating apparatus and a sewing machine. The sewing data generating apparatus comprises: an embroidery frame information acquisition unit that acquires information with respect to an embroidery frame and information with respect to a mark alignment region displayed on a display unit for guiding a plurality of marks provided to the embroidery frame for defining an embroidery region of the embroidery frame; an image acquisition unit that acquires an image of the embroidery frame and a sewing target mounted on a base cloth mounted on the embroidery frame when all the plurality of marks are aligned within the mark alignment region in an image displayed on the display unit; an acquired image analyzing unit that performs image analysis for the plurality of marks in the image acquired by the image acquisition unit based on a correspondence with the information with respect to the embroidery frame acquired by the embroidery frame information acquisition unit; an embroidery region determination unit that determines the embroidery region of the embroidery frame based on an analysis result obtained by the acquired image analyzing unit; an outline data generating unit that generates outline data of the sewing target based on the embroidery region thus determined; and a transmission unit that transmits, to the sewing machine, the outline data generated by the outline data generating unit or otherwise the sewing data for the sewing target generated based on the outline data. The sewing machine comprises: a reception unit that receives the outline data or otherwise the sewing data transmitted from the transmission unit; and a sewing operation executing unit that executes a sewing operation for the outline of the sewing target according to the outline data or otherwise the sewing data received by the reception unit.

With at least one embodiment of the present invention, such an arrangement has an advantage of allowing an applique to be sewn at an accurate position without a need to prepare dedicated data beforehand. Thus, such an arrangement supports an applique design freely cut by the user as well as an applique intentionally cut by the user with a different design, thereby providing an improved degree of freedom in sewing.

DETAILED DESCRIPTION

Detailed description will be made regarding an embodiment of the present invention with reference to the drawings.

First Embodiment

Description will be made with reference to FIGS. 1 through 17 regarding a sewing system according to a first embodiment.

[Configuration of the Sewing System]

Figure 1:
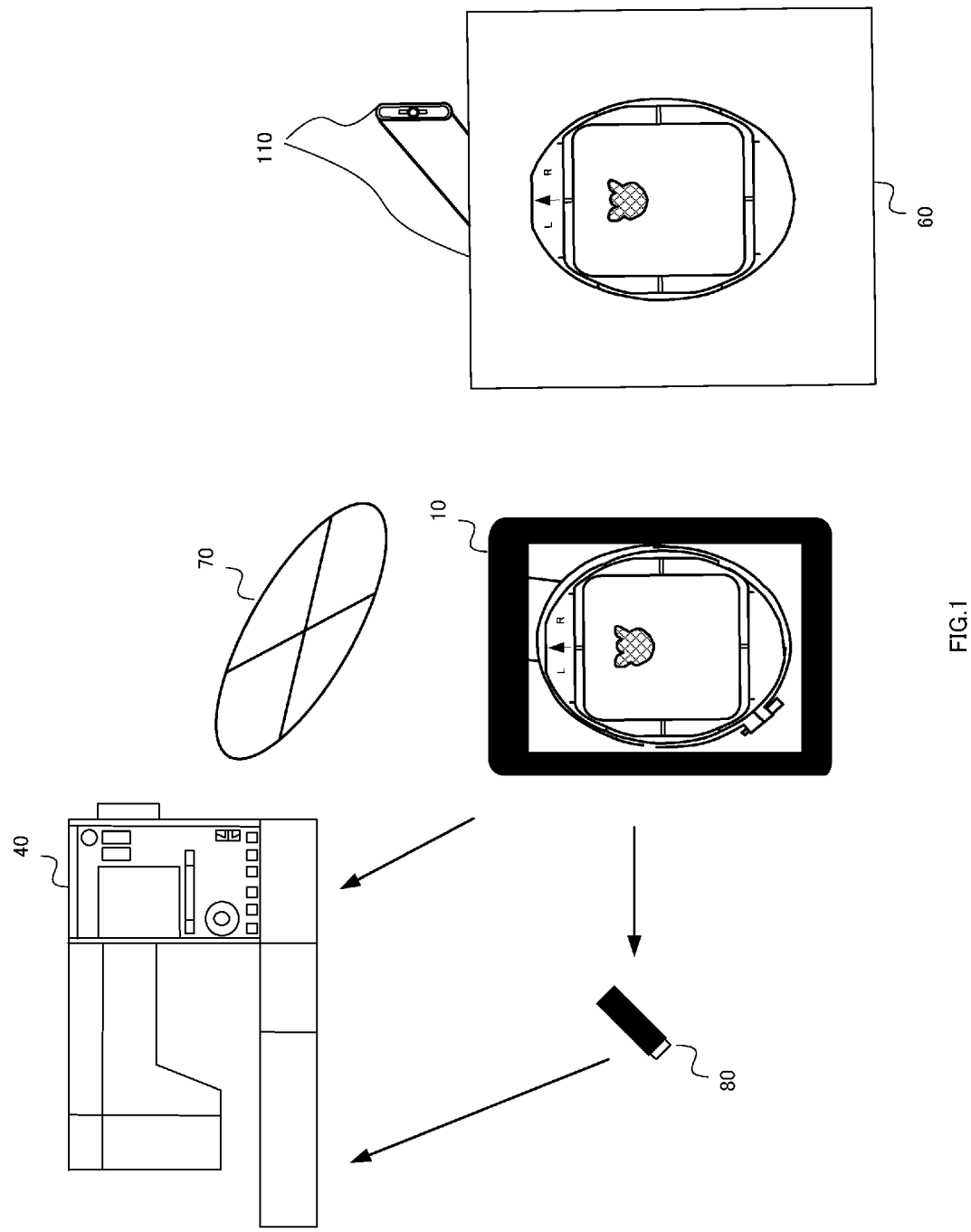
FIG. 1 is a diagram showing a schematic configuration of a sewing system according to a first embodiment of the present invention.

As shown in FIG. 1, the sewing system according to the present embodiment is configured including a sewing machine 40 and a tablet terminal 10 configured as a sewing data generating apparatus. The sewing machine 40 and the tablet terminal 10 are connected to each other via a network such as a wireless LAN 70 or the like. It should be noted that the present embodiment is not restricted to such an arrangement employing such a network such as the wireless LAN 70 or the like. For example, a communication system may be employed using Bluetooth (trademark). Also, an off-line communication system may be employed using USB memory 80 or the like, for example.

The sewing system according to the present embodiment employs an embroidery frame having marks at particular positions that can be visually identified for defining an embroidery region when a base cloth is fixedly mounted. After the user temporarily bonds an applique cloth cut in a desired shape to the base cloth, the user stretches the base cloth over the embroidery frame. When the user specifies the embroidery frame to be used, the sewing system acquires mark alignment region information used to provide alignment guidance for indicating a region where the marks are to be aligned. The sewing system displays images in a superimposed manner with respect to the mark alignment region used to provide alignment guidance for indicating a region where the marks are to be aligned, the embroidery frame including the marks, and the base cloth mounted on the embroidery frame and mounting a sewing target. The sewing system prompts the user to perform a positioning operation for the embroidery frame including the marks such that the marks are all positioned within the mark alignment region. After the marks are all positioned within the mark alignment region, the sewing system acquires an image displayed on a display unit. The sewing system performs image analysis based on a correspondence between the information with respect to the embroidery frame thus acquired and the marks in the image acquired by the image acquisition unit. Subsequently, the sewing system determines the sewing region and generates the sewing data for sewing an applique based on the analysis result. Detailed description thereof will be made below.

Figure 2:
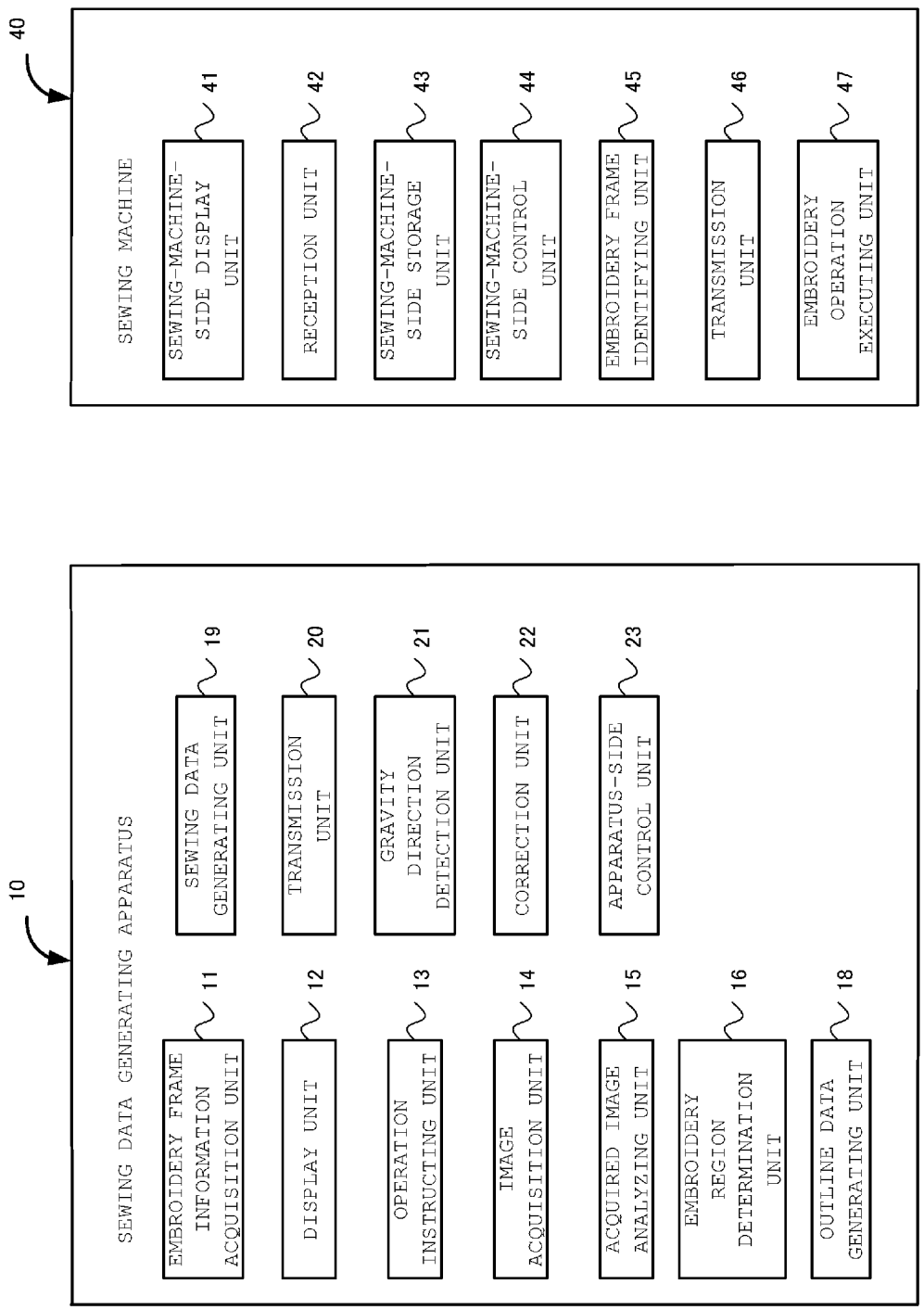
FIG. 2 is a diagram showing an electrical configuration of the sewing system according to the first embodiment of the present invention.

As shown in FIG. 2, the sewing machine 40 comprises a sewing-machine-side display unit 41, a reception unit 42, a sewing-machine-side storage unit 43, a sewing-machine-side control unit 44, an embroidery frame identifying unit 45, a transmission unit 46, and an embroidery operation executing unit 47. Here, the sewing machine 40 provides semi-automatic embroidery using multiple threads having different colors according to the embroidery data, for example. In addition, the sewing machine 40 is configured as a multi-function sewing machine that supports ordinary sewing according to various kinds of sewing patterns.

The sewing-machine-side display unit 41 is provided to the sewing machine 40 itself. For example, the sewing machine-side-display unit 41 is configured as a liquid crystal display apparatus. The sewing-machine-side display unit 41 displays various kinds of information useful for the user according to the sewing machine operating state. For example, in a threading operation, the sewing-machine-side display unit 41 displays content for assisting the user to perform the threading operation. The sewing machine 40 is configured as a multi-function sewing machine. Accordingly, various kinds of content to be displayed are prepared. Also, the sewing-machine-side display unit 41 is configured as a touch panel to allow the user to input various operation instructions.

The reception unit 42 and the transmission unit 46 are connected to the tablet terminal 10 via the wireless LAN 70 or the like. This enables wireless bidirectional communication between the sewing machine 40 and the tablet terminal 10 via an unshown router or the like. It should be noted that the present invention is not restricted to such an arrangement employing a network such as the wireless LAN 70 or the like. For example, a communication system may be employed using Bluetooth (trademark). Also, an off-line communication system may be employed using USE memory 80 or the like, for example.

The sewing-machine-side storage unit 43 is configured as ROM (Read Only Memory), RAM (Random Access Memory), flash memory, or the like, and stores several hundred kinds of embroidery design data, for example. Also, in addition to the designs (embroidery design data) and the information with respect to the embroidery frames stored beforehand in the sewing machine 40, the sewing-machine-side storage unit 43 may store additional designs or the like (user-prepared designs) which are obtained by the user from external data. Also, the sewing-machine-side storage unit 43 is configured to allow the data stored in it, such as the embroidery design data, the information relating to the embroidery design data, and the information with respect to the embroidery frames, to be transmitted to the tablet terminal 10.

The sewing-machine-side control unit 44 controls the operation of the sewing machine 40 according to the control program. Furthermore, the sewing-machine-side control unit 44 performs a response operation according to an inquiry from the tablet terminal 10. In addition, the sewing-machine-side control unit 44 is capable of performing a control operation so as to allow the user to perform simple data editing operations such as selection, mixing, transformation, etc., on the embroidery designs using the sewing machine 40 itself with the display function and the input function of the sewing-machine-side display unit 41.

The embroidery frame identifying unit 45 identifies the kind of the embroidery frame 110 mounted on the sewing machine 40. The embroidery frame identifying unit 45 according to the present embodiment identifies the kind of the embroidery frame 110 mounted on the sewing machine 40 by way of the kind of the embroidery frame 110 input or otherwise selected by the user via the sewing-machine-side display unit 41. It should be noted that the embroidery frame identifying method used by the embroidery frame identifying unit 45 is not restricted to such an arrangement. Also, the kind of the embroidery frame 110 mounted on the sewing machine 40 may be identified using an IC chip or a contact circuit.

The embroidery operation executing unit 47 executes an embroidery operation on the outline of a sewing target (e.g., applique cloth) mounted on a base cloth mounted on the embroidery frame 110 according to the sewing data received from the sewing data generating unit 19 via the reception unit 42.

The tablet terminal 10 may be configured as a commercially available general-purpose tablet terminal. Before such a tablet terminal 10 is used as the sewing data generating apparatus according to the present embodiment, a program for supporting the sewing system (an application program) and a program for detecting the embroidery region (application program) are installed on the tablet terminal 10 and the program thus installed are executed. It should be noted that such issues may be recorded on a recording medium such as a flash memory device or the like. Also, such issues may be obtained by downloading via various kinds of known networks. It should be noted that description is being made in the present embodiment regarding such a tablet terminal 10 as a specific example of the sewing data generating apparatus. However, the present invention is not restricted to such an arrangement. Also, a smartphone may be employed, for example. Alternatively, a camera or the like having a function required to function as the sewing data generating apparatus may be employed, which is mounted on the sewing machine 40 by means of a mechanism that allows it to be fixedly mounted at a position where it can acquire an image of the overall area of the embroidery frame.

As shown in FIG. 2, the tablet terminal 10 comprises an embroidery frame information acquisition unit 11, a display unit 12, an operation instructing unit 13, an image acquisition unit 14, an acquired image analyzing unit 15, an embroidery region determination unit 16, an outline data generating unit 18, a sewing data generating unit 19, a transmission unit 20, a gravity direction detection unit 21, a correction unit 22, and an apparatus-side control unit 23.

Figure 4:
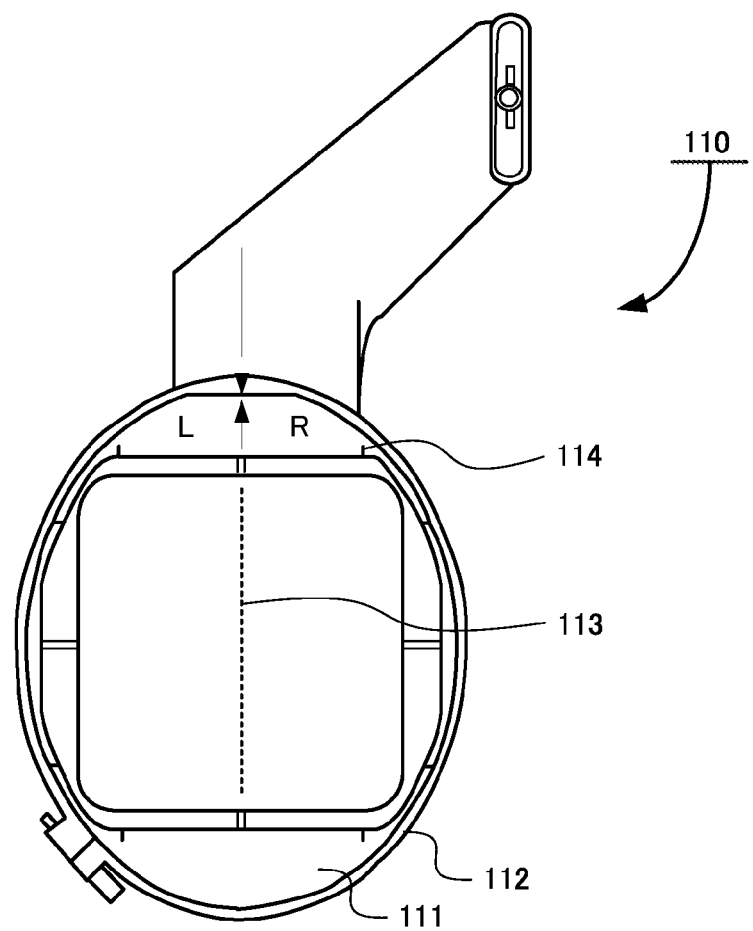
FIG. 4 is a diagram showing an example of an embroidery frame according to the first embodiment of the present invention.
Figure 13:
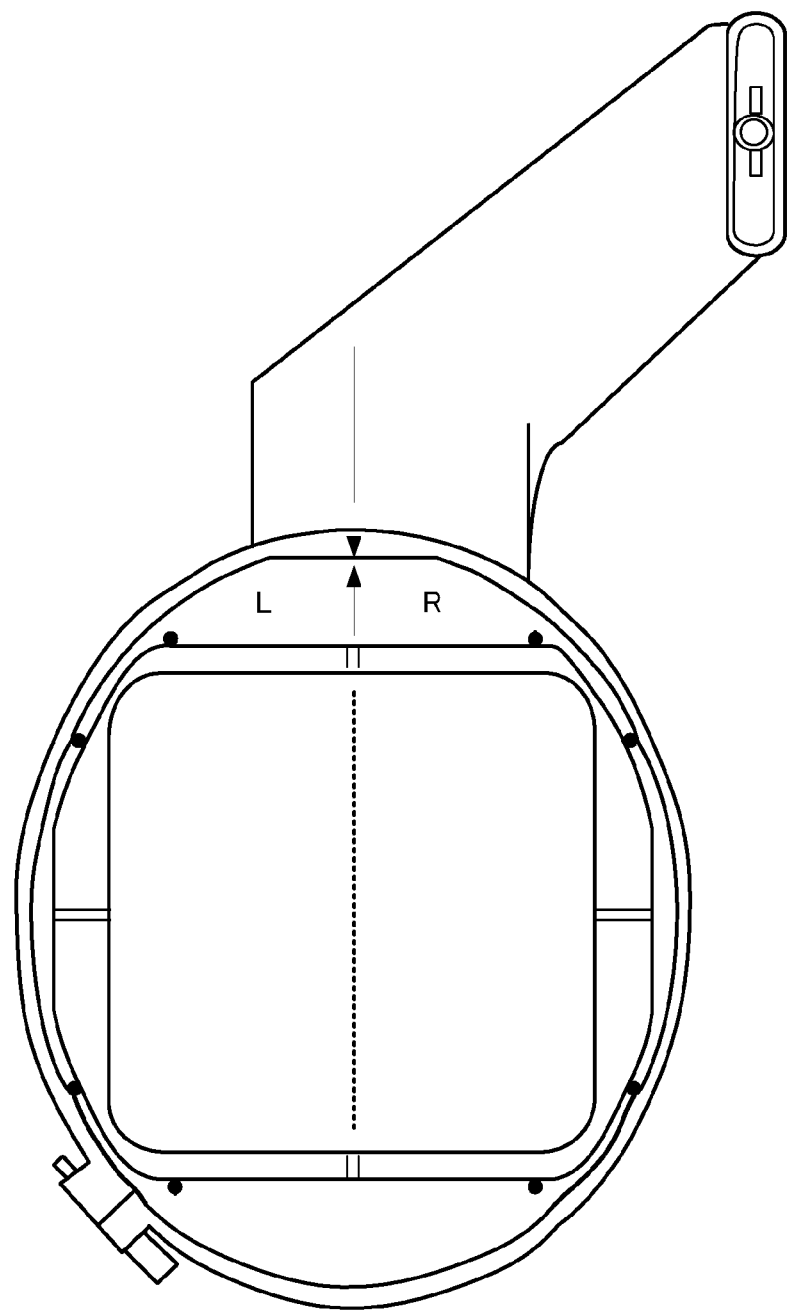
FIG. 13 is a diagram showing an example of a different kind of the embroidery frame according to the first embodiment of the present invention.
Figure 14:
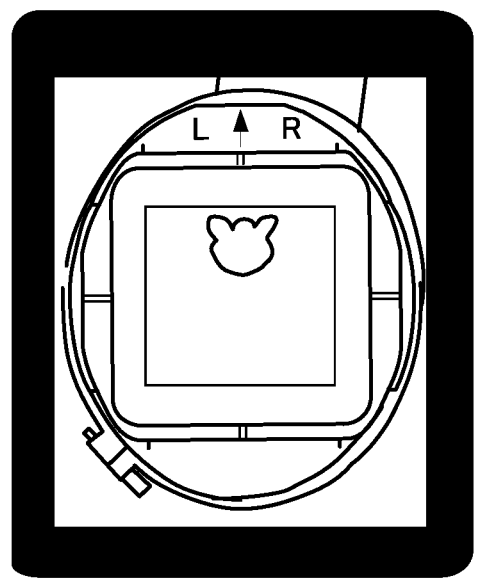
FIG. 14 is a diagram showing an example state in which an outline of the applique cloth is displayed after the outline is extracted by means of image processing according to the first embodiment of the present invention.
Figure 15:
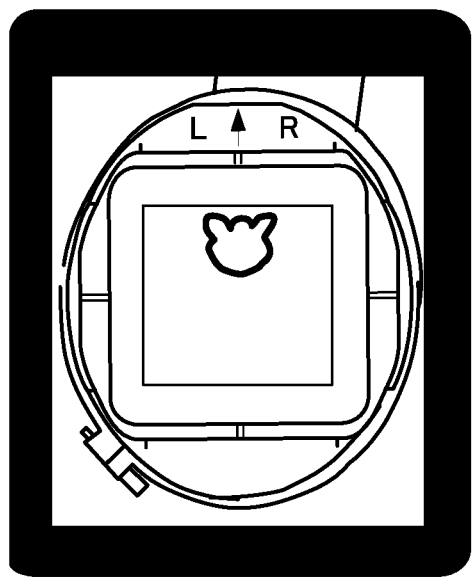
FIG. 15 is a diagram showing an example state according to the first embodiment of the present invention in which sewing data is generated after the outline of the applique cloth is determined.

The embroidery frame information acquisition unit 11 acquires information with respect to the kind of the embroidery frame and the mark alignment region information with respect to a region for guiding an alignment operation for the marks provided to the embroidery frame 110 at particular positions that allow them to be visually identified for defining an embroidery region when an embroidery target cloth is fixedly mounted. As shown in FIG. 4, the embroidery frame 110 employed in the present embodiment is formed of an inner frame 111, an outer frame 112, and embroidery region marks 114. The embroidery region marks 114 are formed in the form of short lines that pass through the embroidery frame such that they are arranged on lines that extend along the four sides of the embroidery region having a rectangular shape. Furthermore, the embroidery region marks 114 are each formed as a mark in the form of a short straight line on the inner frame 111 of the embroidery frame 110. Description is being made in the embodiment regarding an arrangement including eight embroidery region marks 114 each formed as a mark in the form of a vertical line or otherwise a horizontal line on the inner frame 111. It should be noted that description is being made for exemplary purposes regarding the embroidery frame 110 comprising the inner frame 111 and the outer frame 112 formed as separate frames. Also, the embroidery frame 110 may have a hinge structure in which such a pair of frames includes a coupling portion such that, by turning one frame, the two frames overlap. Also, as shown in FIG. 13, each of the embroidery region marks 114 may be configured to differ in terms of at least one property from among the color and shape according to the kind of the embroidery region marks 114. As described above, by configuring the embroidery region marks 114 to have different colors or shapes according to the kind of the embroidery region marks 114, such an arrangement allows the image to be easily recognized. Description is being made in the present embodiment for exemplary purposes regarding an arrangement in which the embroidery region is configured to have a rectangular shape. Also, by providing additional embroidery region marks to the eight embroidery region marks 114 according to the present embodiment, such an arrangement is applicable to a case in which the embroidery region has other shapes such as a polygonal shape, circular shape, semi-circular shape, or the like. Also, in order to support various kinds of embroidery regions, other kinds of marks may be arranged according to the various kinds of embroidery regions. In this case, such marks may be designed to have a color or a shape that is defined according to the embroidery region. As described above, by providing the embroidery frame with such marks that support multiple embroidery regions, such an arrangement allows the kinds of the embroidery frames to be reduced to a minimum. Also, by configuring the marks to have different colors or shapes according to multiple different embroidery ranges, such an arrangement allows the marks to be identified in a simple manner in the image processing operation.

The display unit 12 displays a superimposed image comprising images of the mark alignment region (shaded area in FIG. 6) for guiding the embroidery marks 114 of the embroidery frame 110 acquired by the embroidery frame information acquisition unit 11, the embroidery frame 110 including the embroidery region marks 114, and the base cloth mounted on the embroidery frame 110. Furthermore, the display unit 12 displays an image acquisition orientation guiding display for guiding the alignment between the image acquisition optical axis of the image acquisition unit 14 and the gravity direction based on the detection result obtained by the gravity direction detection unit 21 described later. By providing such a guidance display, such an arrangement allows the user to easily set the tablet terminal 10 in the horizontal state. Furthermore, after the embroidery region is determined, the display unit 12 displays a reference embroidery frame image with the determined embroidery region and an image of the embroidery frame mounting the base cloth mounting a sewing target in a superimposed manner. In addition to a function for displaying such various kinds of images, the display unit 12 is configured including an unshown operating unit in order to function as a touch panel.

In addition to displaying such information, the display unit 12 allows the user to input various kinds of operation instructions.

The operation instructing unit 13 prompts the user to perform a positioning operation for the embroidery frame 110 including the embroidery region marks 114 such that all the embroidery region marks 114 are each positioned within the corresponding mark alignment region. It should be noted that such an arrangement may provide a guidance display or otherwise audio guidance, etc., in order to prompt the user to perform the positioning operation. By providing such a guidance display or otherwise audio guidance, etc., such an arrangement allows the user to easily perform the positioning operation even if the user is inexperienced in the use of the tablet terminal 10.

When all the embroidery region marks 114 are each positioned within the corresponding mark alignment region, the image acquisition unit 14 acquires an image displayed on the display unit 12. It should be noted that, in actuality, the user performs image acquisition using the tablet terminal 10 held in the user's hands. Also, the image acquisition may be automatically performed when judgment has been made that the embroidery region marks 114 are each positioned within the corresponding mark alignment region and judgment has been made based on the detection result obtained by the gravity direction detection unit 21 described later that the image acquisition optical axis is aligned with the gravity direction. As described above, by automatically acquiring an image by means of image analysis, such an arrangement is capable of preventing degradation in image quality due to camera shake or the like, thereby providing high-precision image acquisition.

The acquired image analyzing unit 15 performs image analysis based on the correspondence between the information with respect to the embroidery frame 110 acquired by the embroidery frame information acquisition unit 11 and the embroidery region marks 114 in the image acquired by the image acquisition unit 14. Specifically, the acquired image analyzing unit 15 performs thinning image processing on the acquired image of the embroidery region marks 114. This allows the embroidery region to be identified and determined.

The embroidery region determination unit 16 determines the embroidery region based on the analysis result obtained by the acquired image analyzing unit 15.

The outline data generating unit 18 generates the outline data of the sewing target based on the embroidery region thus determined. Specifically, the outline data generating unit 18 generates the outline data of the sewing target based on the coordinate positions of the marks or otherwise the coordinate positions of the four corners that define the embroidery region. As described above, after the embroidery region is determined for the embroidery frame 110, such an arrangement is able to acquire the coordinate positions of the four corners that define the embroidery region. Thus, such an arrangement is capable of simply and accurately generating the outline data of the sewing target based on the coordinate positions of the four corners thus acquired.

The sewing data generating unit 19 generates the sewing data based on the outline data generated by the outline data generating unit 18. The transmission unit 20 transmits the sewing data thus generated by the sewing data generating unit 19 to the sewing machine 40. It should be noted that description is being made in the present embodiment for exemplary purposes regarding an arrangement in which the tablet terminal 10 (sewing data generating apparatus) generates the sewing data as its final data. Also, an arrangement may be made in which the tablet terminal 10 (sewing data generating apparatus) generates the outline data as its final data and transmits the outline data thus generated to the sewing machine 40, following which the sewing machine 40 generates the sewing data based on the outline data received from the tablet terminal 10.

The gravity direction detection unit 21 detects the gravity direction with respect to the tablet terminal 10, so as to detect the inclination of the tablet terminal 10 with respect to the horizontal axis. The user is able to monitor, via the acquired image orientation guidance display, the detection result obtained by the gravity direction detection unit 21. Also, the gravity direction detection unit 21 may be configured as a level sensor, a geomagnetic sensor, or the like. By providing the gravity direction detection unit 21, such an arrangement allows the user to easily hold the tablet terminal 10 in a horizontal state. When the embroidery region in the image acquired by the image acquisition unit 14 is inclined with respect to the display screen of the display unit 12, the correction unit 22 performs correction for the inclination. By performing such correction, such an arrangement is capable of providing embroidery with high-precision positioning in the embroidery region.

The apparatus-side control unit 23 controls the operation of the tablet terminal 10 according to a control program. Furthermore, the tablet terminal 10 includes an unshown storage unit configured as ROM (Read Only Memory), RAM (Random Access Memory), flash memory, or the like, and stores various kinds of data such as image data acquired by the image acquisition unit 14 and the like. It should be noted that, with the present embodiment, examples of such data stored in the storage unit include the embroidery frame information, embroidery frame image, mark alignment region image, gravity direction determination image, operation guidance program, audio data, display data, and the like. Specifically, the apparatus-side control unit 23 instructs the display unit 12 to display a reference embroidery frame having a determined embroidery region.

[Operation of the Sewing System]

Description will be made with reference to FIGS. 3 through 17 regarding the operation of the sewing system according to the present embodiment.

First, as a preparation step, the user mounts a base cloth mounting an applique cloth on the embroidery frame 110, and places the embroidery frame 110 in a horizontal position.

Figure 5:
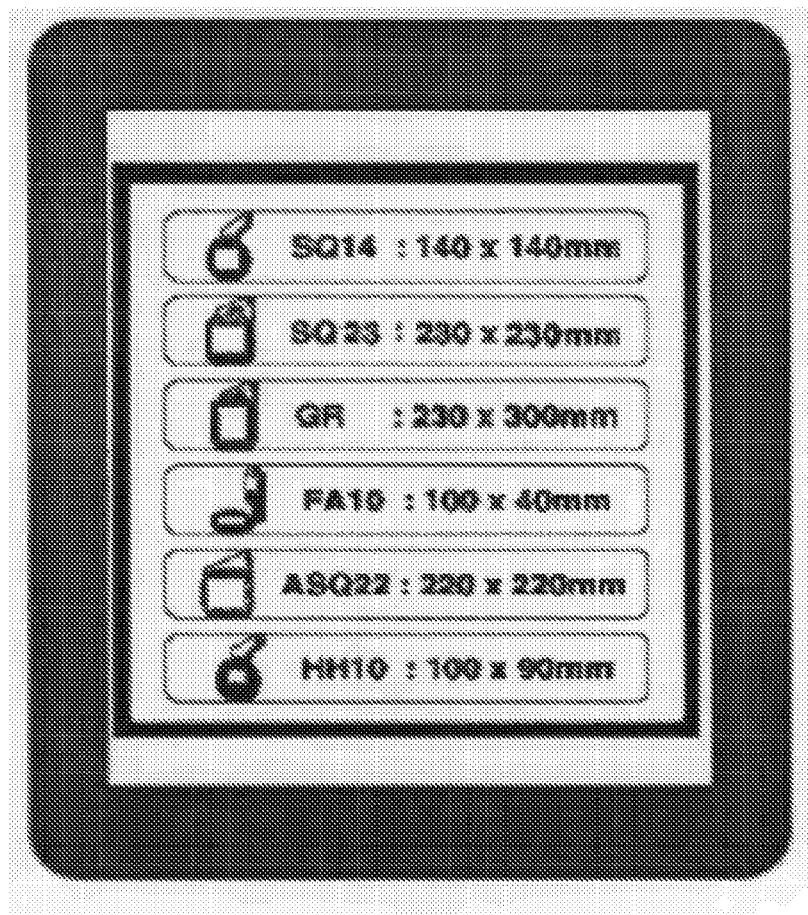
FIG. 5 is a diagram showing an example of a state according to the first embodiment of the present invention in which multiple embroidery frames are displayed on a display screen of the embroidery region detection apparatus in order to enable selection of the embroidery frame.
Figure 6:
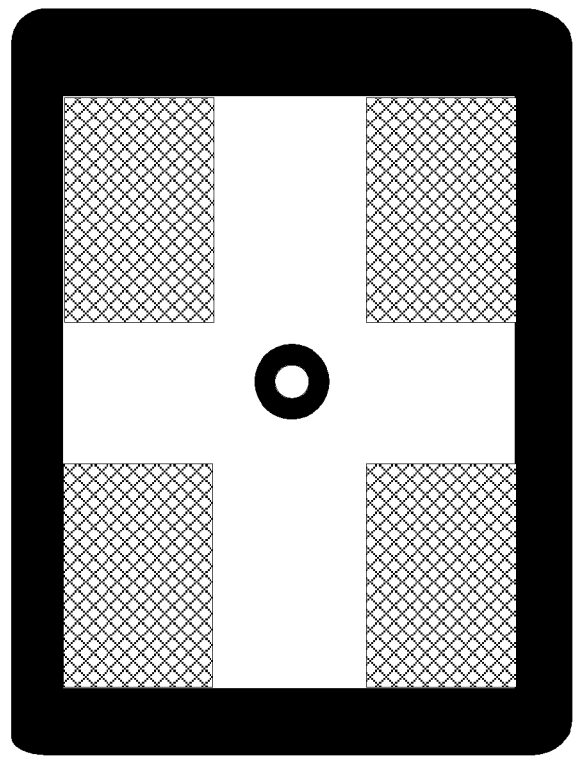
FIG. 6 is a diagram showing an example of an embroidery region mark alignment region displayed on a display screen of the sewing data generating apparatus according to the first embodiment of the present invention.
Figure 7:
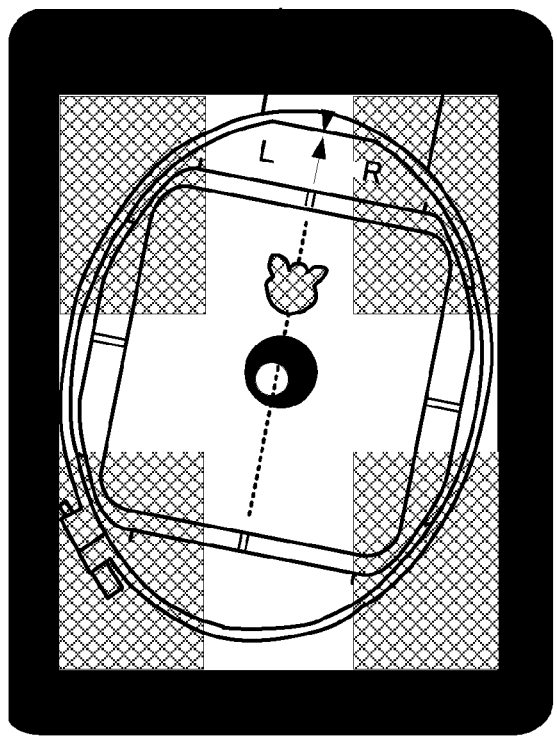
FIG. 7 is a diagram showing an example of a state in which position alignment is performed such that the embroidery region marks are positioned within the alignment region displayed on a display screen of the sewing data generating apparatus according to the first embodiment of the present invention.
Figure 8:
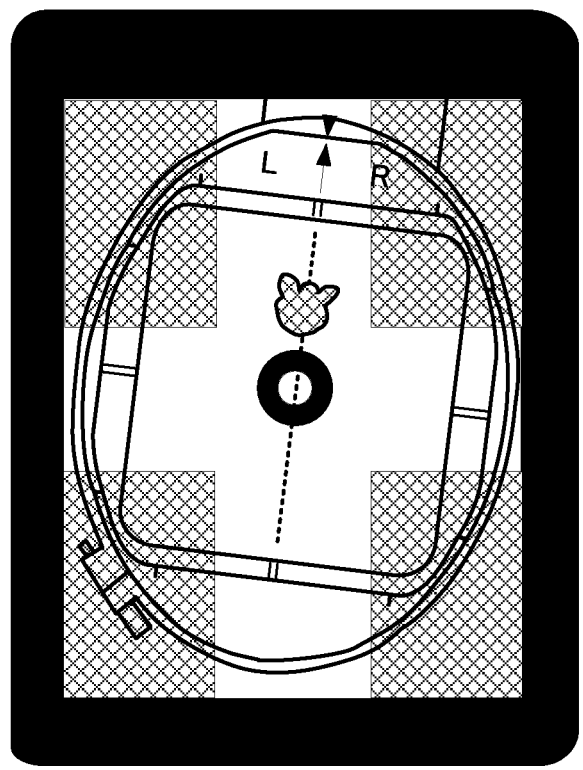
FIG. 8 is a diagram showing an example of a state in which position alignment is performed such that the embroidery region marks are positioned within the alignment region displayed on a display screen of the sewing data generating apparatus according to the first embodiment of the present invention.

The user selects the same frame type as that of the embroidery frame 110 mounting the base cloth from the list shown in FIG. 5. In this stage, the image acquisition unit 14 starts up, and the display unit 12 of the tablet terminal 10 displays a screen as shown in FIG. 6 (Step S101). Furthermore, the display unit 12 displays a real-time image as a superimposed image (Step S102). FIG. 6 shows an image including: an image of the image acquisition alignment regions positioned on four corners thereof for the embroidery region marks determined beforehand according to the embroidery frame type; and an image of a level indicator on the central portion thereof that indicates the degree of horizontality of the tablet terminal 10. When the inner circle shown as a white circle is aligned with the center of the outer circle after the user adjusts the level of the tablet 10, this indicates that the tablet terminal 10 has come to be in a horizontal state. The user adjusts the position of the tablet such that the eight embroidery region marks 114 are all positioned within the image acquisition alignment regions for the embroidery region marks, and such that the inner circle shown as a white circle configured as a level indicator is aligned with the center of the outer circle. It should be noted that an image input in a real-time manner may be analyzed so as to automatically detect whether or not the embroidery region marks 114 are each positioned in a corresponding narrow region (shaded region in FIGS. 7 and 8) defined beforehand according to the kind of the embroidery frame 110. Such an arrangement may notify the user of the detection result by means of a buzzer or the like.

The user holds the tablet terminal 10 such that the image acquisition unit 14 faces the embroidery frame 110 over which the cloth has been stretched. Judgement is made, by means of image processing, regarding whether or not all the eight embroidery region marks 114 provided to the inner frame 111 are each positioned within the corresponding one of the embroidery region mark alignment regions provided to the four corners of the display unit 12 of the tablet terminal 10 (Step S103). When judgement has been made that the embroidery region marks 114 are not each positioned within the corresponding embroidery region mark alignment region ("NO" in Step S104), the flow returns to Step S102, and image acquisition is performed again.

When judgement has been made that each embroidery region mark 114 is positioned within the corresponding embroidery region mark alignment region ("YES" in Step S104), the flow proceeds to Step S105 in which the sensor value of the level sensor is read out and judgment is made whether or not the tablet terminal 10 is in a horizontal state (Step S106). When judgment has been made that the tablet terminal 10 is not in a horizontal state ("NO" in Step S106), the flow returns to Step S102, and the image acquisition is performed again. When judgment has been made that the tablet terminal 10 is in a horizontal state ("YES" in Step S106), judgement is made that the image acquisition condition has been satisfied. In this case, the flow proceeds to Step S107 in which the image displayed in this stage is acquired and stored in the memory as the image data.

Figure 9:
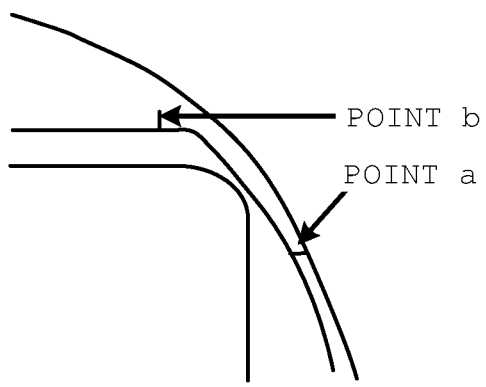
FIG. 9 is a diagram showing an example of a state according to the first embodiment of the present invention in which thinning image processing is performed on the marks provided to the embroidery frame.
Figure 10:
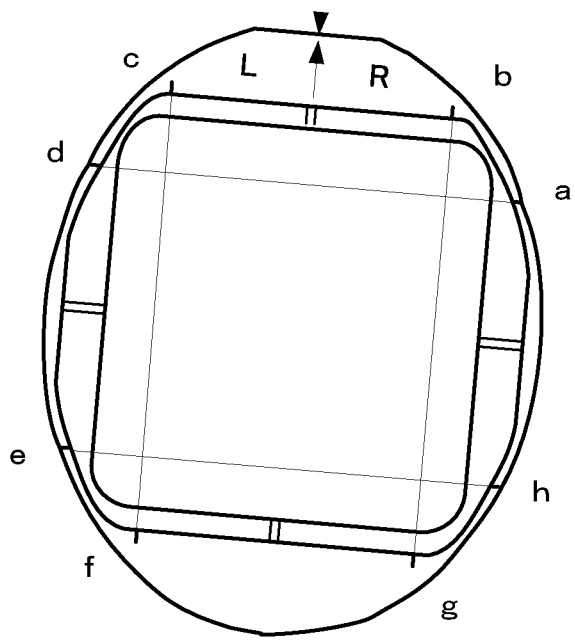
FIG. 10 is a diagram showing an example of a state according to the first embodiment of the present invention in which a line is defined between each pair of opposing marks provided to the embroidery frame.

The embroidery region marks 114 printed on the inner frame 111 of the embroidery frame 110 have a given thickness and a given length. Accordingly, as shown in FIG. 9, thinning image processing is performed (Step S108). Subsequently, the coordinate position of an intermediate point is acquired for each of the eight lines. Furthermore, as shown in FIG. 10, lines are defined such that they pass through a pair of opposing intermediate points of the aforementioned eight lines. That is to say, such lines are defined based on the coordinate positions of the points a through h.

Four equations are derived based on the coordinate positions of the points a through h, such that they represent the four lines, i.e., the line a-d, the line h-e, the line b-g, and the line c-f. Next, the equations are solved so as to calculate the intersection for each pair of lines that are orthogonal to each other, i.e., the intersections between the line a-d and the line b-g, between the line a-d and the line c-f, between the line c-f and the line h-e, and between the line h-e and the line b-g. With the intersection between the line a-d and the line b-g as k, with the intersection between the line a-d and the line c-f as l, with the intersection between the line c-f and the line h-e as m, and with the intersection between the line h-e and the line b-g as n, lines are defined such that they pass through the intersections as shown in FIG. 11, thereby defining the embroidery region having a rectangular shape (Step S109).

Figure 11:
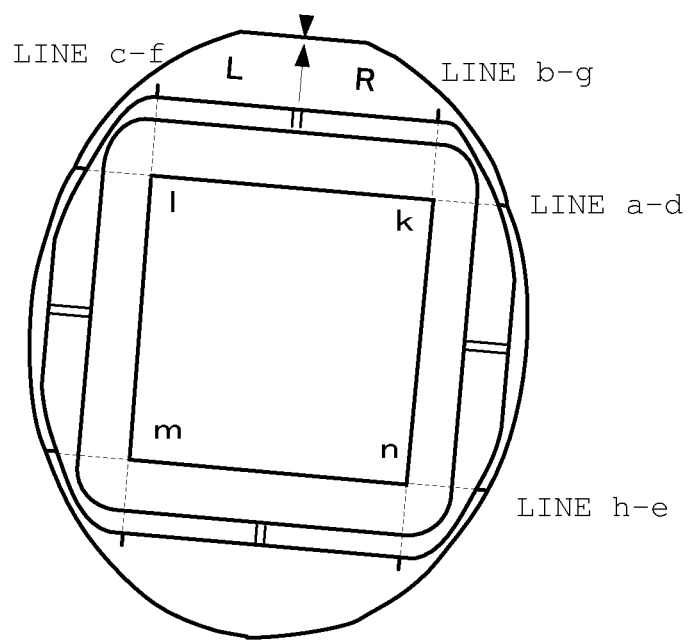
FIG. 11 is a diagram showing an example of a state according to the first embodiment of the present invention in which a line is defined between each pair of opposing marks, intersections are calculated based on the lines thus defined, and a line is defined between each pair of intersections so as to determine a rectangular embroidery region.
Figure 12:
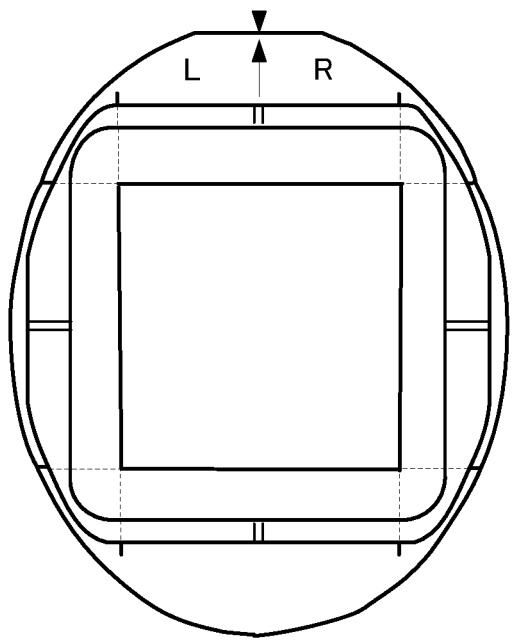
FIG. 12 is a diagram showing an inclination correction according to the first embodiment of the present invention performed after the rectangular embroidery region is determined.

FIG. 11 shows an example case in which the tablet terminal 10 is held by the user in an inclined manner. Accordingly, the acquired image has a corresponding inclination, leading to the image of the embroidery region having the same inclination. In order to address such an issue, the inclination is corrected, i.e., rotation correction is performed such that the acquired image is aligned with the center axis of the tablet terminal, thereby providing the screen display as shown in FIG. 12 (Step S110).

The user touches an area of the applique cloth displayed in the form of an image on the display unit 12 in order to specify the applique cloth area to be extracted (Step S111). After the user touches the applique cloth area to be extracted, the outline data generating unit 18 is started up. The outline data generating unit 18 performs first derivation processing on the image data of the applique cloth so as to calculate difference data in the X-direction (e.g., the horizontal axis direction in FIG. 14), Y-direction (e.g., the vertical axis direction in FIG. 14), or the oblique direction. Furthermore, the outline data generating unit 18 extracts the outline of the applique cloth (Step S112). Moreover, the outline data generating unit 18 performs thinning image processing so as to convert the image data of the applique cloth into image data in units of pixels forming lines (Step S113). It should be noted that the outline data may be extracted by means of image processing using an edge detection function.

Figure 16:
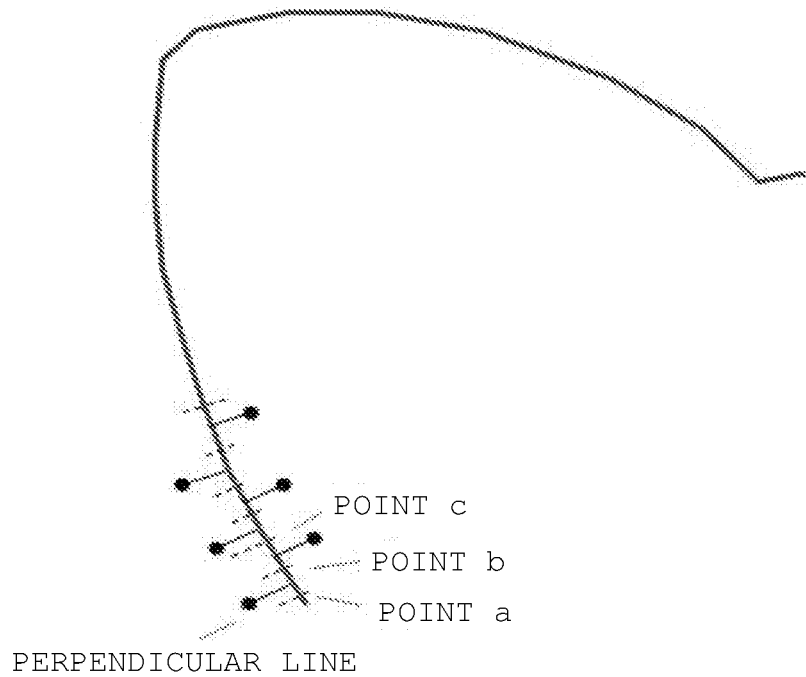
FIG. 16 is a diagram showing an example state according to the first embodiment of the present invention in which stitching points are determined for the output line of the applique cloth.
Figure 17:
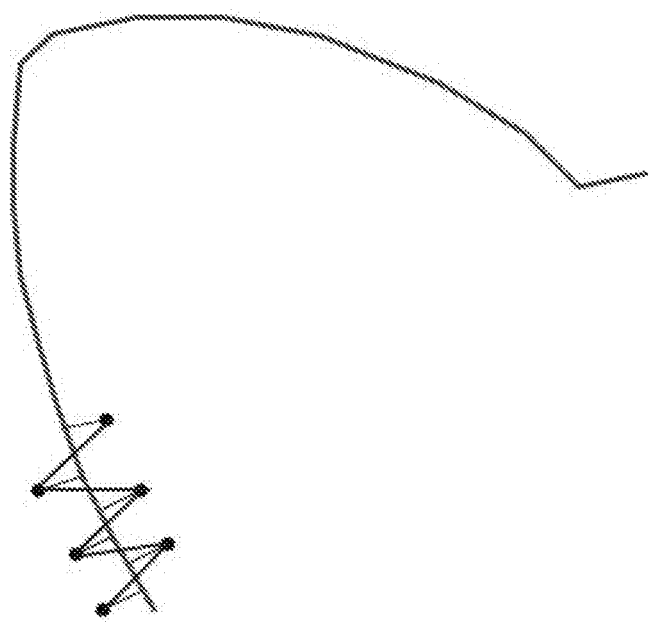
FIG. 17 is a diagram showing an example state according to the first embodiment of the present invention in which a zig-zag stitching pattern is formed on the applique cloth.

The user specifies a start point for a zig-zag stitching operation (Step S114). After the start point for the zig-zag stitching operation is specified, a zig-zag stitching pattern is generated from the start point thus specified in a clockwise direction, for example (Step S115). In this case, the zig-zag stitching operation is performed as shown in FIGS. 16 and 17, for example. That is to say, the coordinate position is calculated for each of points A and B arranged at an interval of 0.2 mm. A perpendicular line is defined for the line A-B, and a point on the perpendicular line 2.0 mm away from the outline is determined as a needle location point. In the same way, a perpendicular line is defined for the line B-C in a direction that is opposite to the perpendicular line defined for the line A-B, so as to calculate the next needle location point. The subsequent coordinate positions are sequentially determined such that the adjacent needle location points are opposite to each other across the outline. After the sewing data for sewing the applique cloth is generated according to the aforementioned procedure, the display unit 12 of the tablet terminal 10 displays an image of the applique with a sewing pattern based on the sewing data. Subsequently, the transmission unit 20 transmits the sewing data to the reception unit 42 of the sewing machine 40 (Step S116).

After the sewing machine 40 receives the sewing data from the tablet terminal 10, the sewing machine 40 executes a sewing operation for the outline of the sewing target according to the sewing data thus received.

Effects of the Present Embodiment

As described above, with the present embodiment, the embroidery region of the embroidery frame is determined based on the information with respect to the embroidery frame 110 having a known size and a known actual embroidery region. After a base cloth to which an applique cloth has been temporarily bonded by means of an adhesive agent or the like is stretched over the embroidery frame, an image of the base cloth is acquired together with the appearance of the embroidery frame. Thus, such an arrangement is capable of acquiring image magnification factor information, and of extracting the outline of the applique cloth in the form of image data. Furthermore, such an arrangement generates sewing data for zig-zag stitches or the like to be formed along the outline thus extracted. By using such sewing data, such an arrangement only requires the user to mount the embroidery frame with the base cloth on the sewing machine to provide accurate zig-zag switching along the outline of the applique cloth. That is to say, such an arrangement allows the applique cloth to be sewn to the base cloth at an accurate position with stitching along the outline of the applique cloth without a need to prepare dedicated data beforehand.

Second Embodiment

Description will be made with reference to FIGS. 18 through 21 regarding a sewing system according to a second embodiment.

In some cases, the base cloth or the applique cloth has a pattern. In this case, in the operation in which the outline of the applique cloth is extracted, unnecessary lines are extracted at the same time. Alternately, the outline is transformed into a broken line or the like after the image processing. As a result, in some cases, this leads to issues. Examples of such issues include: an issue in that the outline thus extracted is not configured as a closed loop; and an issue in that the stitching pattern deviates from the outline of the applique cloth thus extracted. The sewing system according to the present embodiment provides the sewing system according to the first embodiment with a function of correcting the outline or a function of allowing the user to edit the outline. Detailed description will be made below regarding such an arrangement.

[Configuration of the Sewing System]

Figure 18:
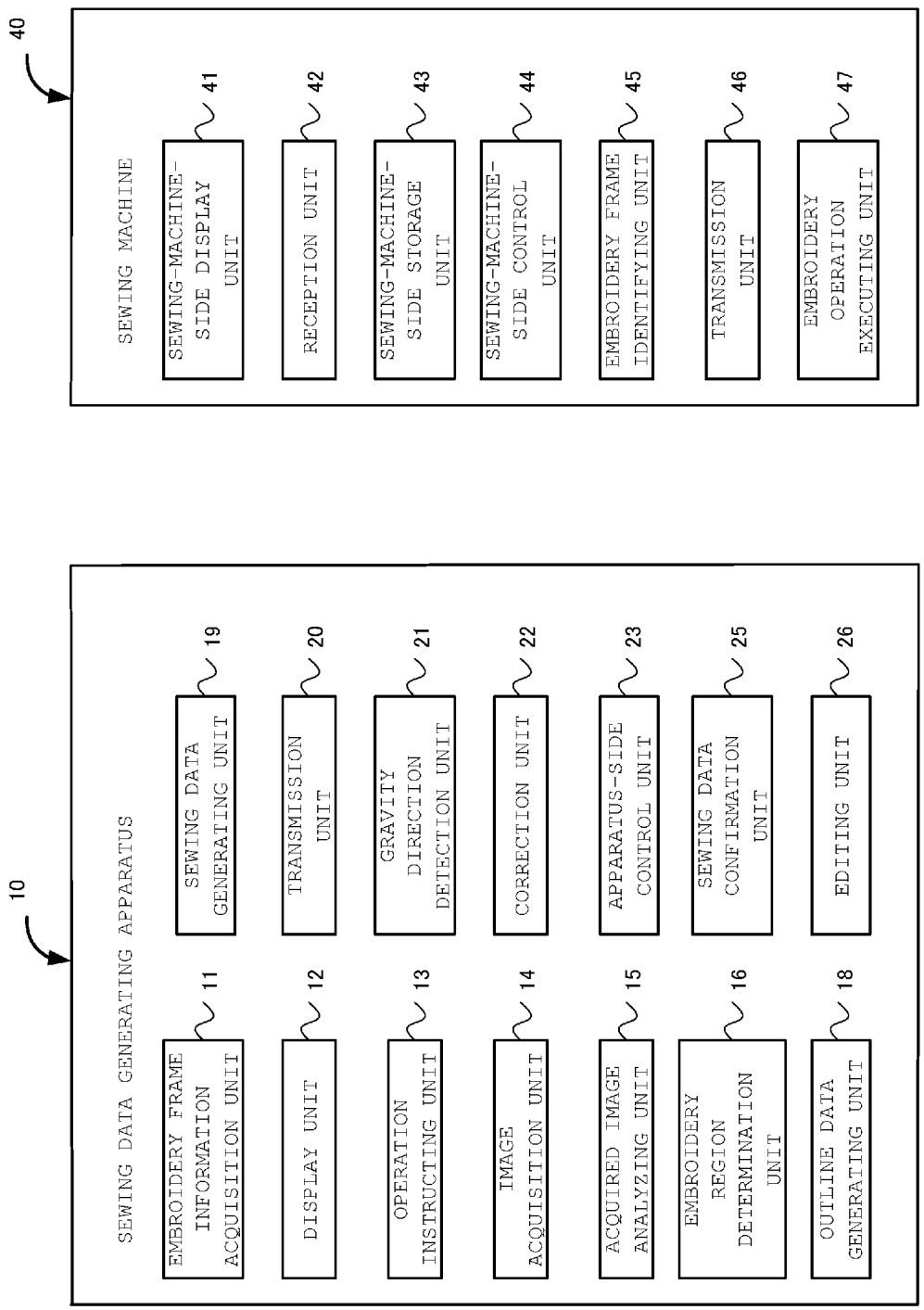
FIG. 18 is a diagram showing an electrical operation of a sewing system according to a second embodiment of the present invention.

As shown in FIG. 18, the sewing machine 40 comprises a sewing-machine-side display unit 41, a reception unit 42, and a sewing-machine-side storage unit 43, a sewing-machine-side control unit 44, an embroidery frame identifying unit 45, a transmission unit 46, and a sewing operation executing unit 47. Moreover, as shown in FIG. 18, the tablet terminal 10 comprises an embroidery frame information acquisition unit 11, a display unit 12, an operation instructing unit 13, an image acquisition unit 14, an acquired image analyzing unit 15, an embroidery region determination unit 16, an outline data generating unit 18, an embroidery data generating unit 19, a transmission unit 20, a gravity direction detection unit 21, a correction unit 22, an apparatus-side control unit 23, a sewing data confirmation unit 25, and an editing unit 26. It should be noted that the components denoted by the same reference symbols as in the first embodiment have the same functions as those in the first embodiment. Accordingly, detailed description thereof will be omitted.

The sewing data confirmation unit 25 instructs the display unit 12 to display an image including a sewing target acquired by the image acquisition unit 14 together with a planned sewing line generated based on the sewing data generated by the sewing data generating unit 19, in order to prompt the user to confirm the sewing plan. Furthermore, the sewing data confirmation unit 25 displays the planned sewing line with a color that can be visually identified easily with respect to the colors in the image including the sewing target. Thus, such an arrangement prevents an issue of failure to satisfactorily confirm the planned stitch line due to the line being difficult to see in a case in which the base cloth and the thread have the same color or a case in which the pattern of the base cloth and the thread have the same color. The editing unit 26 edits the outline data according to an instruction input by the user. Thus, such an arrangement is capable of appropriately correcting the outline of the applique cloth even if an issue occurs in the outline thus extracted, e.g., an issue in that the outline thus extracted is not configured as a closed loop; and an issue in that the stitching pattern deviates from the outline of the applique cloth thus extracted.

[Operation of the Sewing System]

Figure 19:
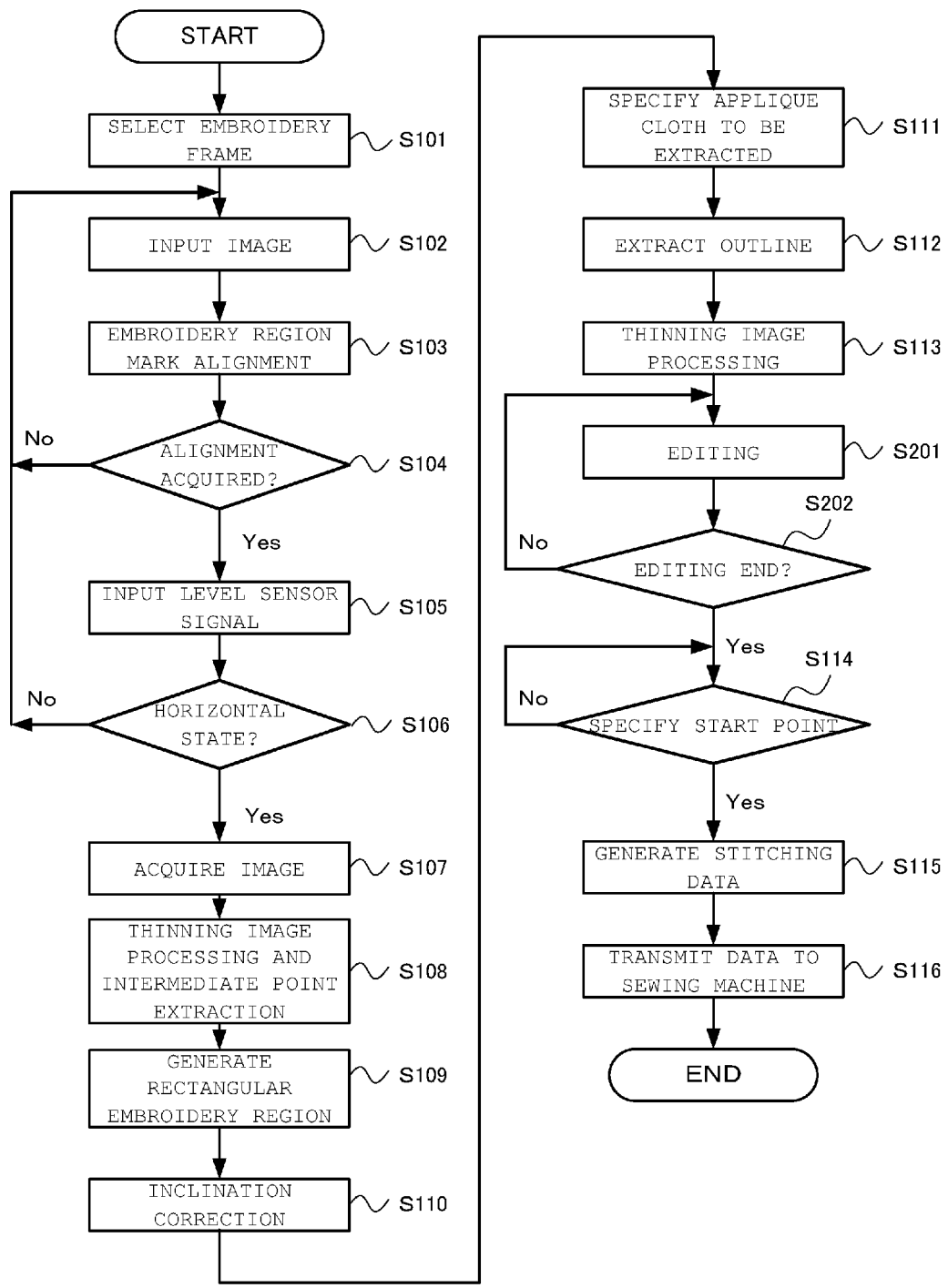
FIG. 19 is a diagram showing an electrical operation of the sewing system according to the second embodiment of the present invention.
Figure 20:
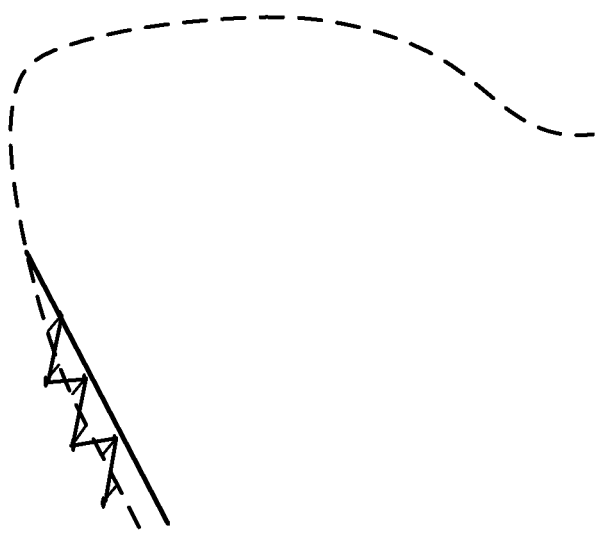
FIG. 20 is a diagram showing a confirmation image for the sewing data according to the second embodiment of the present invention.
Figure 21:
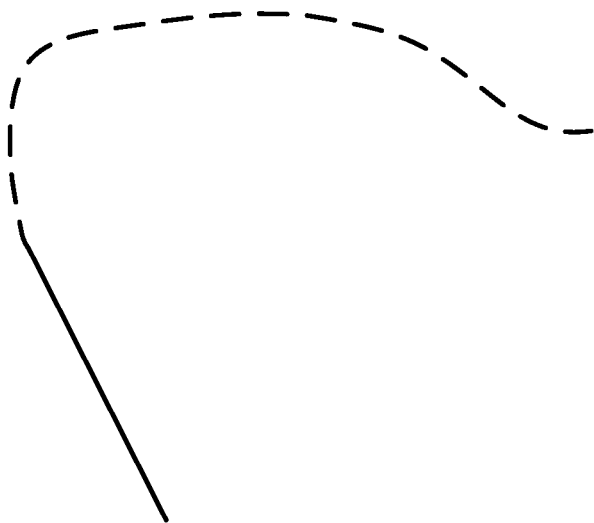
FIG. 21 is a diagram showing an editing operation performed on the confirmation image for the sewing data according to the second embodiment of the present invention.

Description will be made with reference to FIGS. 19 through 21 regarding the operation of the sewing system according to the present embodiment. It should be noted that the operation according to the present embodiment is executed as an intermediate step between the thinning image processing step and the step in which the user specifies the start point according to the first embodiment. At least the flow up to the thinning image processing step is the same as that in the first embodiment. Accordingly, detailed description thereof will be omitted.

When the thinning image processing ends in Step S113, the sewing data confirmation unit 25 is started up. The sewing data confirmation unit 25 displays a planned sewing line (represented by the dotted line in FIGS. 20 and 21). In this step, when an unnecessary line is displayed or otherwise when the outline is not configured as a closed loop, the user edits the image using a finger or a dedicated stylus so as to remove such an unnecessary line or to draw an additional line such that the outline is configured as a closed loop (Step S201). Furthermore, as shown in FIG. 20, the planned sewing line is displayed in a color that can be easily identified visually with respect to the colors in the image including the sewing target. Thus, when the stitch pattern deviates from the outline of the applique cloth (represented by the solid line in the drawing), such an arrangement allows the user to edit the outline data such that it matches the outline of the applique cloth as shown in FIG. 21. Moreover, when a smooth outline is not displayed, such an arrangement may be configured to allow the user to perform an operation such as pinching, dragging, or the like, on a desired portion of a line or a curve in order to edit the outline data. After the editing ends, the flow transits to the step in which the user specifies the start point (Step S202).

Effects of the Present Embodiment

As described above, with the present embodiment, the embroidery region of the embroidery frame is determined based on the information with respect to the embroidery frame 110 having a known size and a known actual embroidery region. After a base cloth to which an applique cloth has been temporarily bonded by means of an adhesive agent or the like is stretched over the embroidery frame, an image of the base cloth is acquired together with the external appearance of the embroidery frame. Thus, such an arrangement is capable of acquiring image magnification factor information. At the same time, such an arrangement is capable of acquiring the outline of the applique cloth in the form of an image. Furthermore, the outline data of the applique cloth is extracted by means of image processing. After the outline data is edited, the outline data thus edited and the outline of the applique cloth are displayed in a superimposed manner. Thus, by executing the embroidery operation after the user mounts the embroidery frame with the base cloth on the sewing machine in a state in which the applique cloth has been temporarily bonded to the base cloth, such an arrangement provides accurate zig-zag sewing along the outline of the applique cloth without a need to hold dedicated data beforehand. Moreover, such an arrangement generates the embroidery data to be used to sew the applique cloth after the applique cloth is mounted. Thus, such an arrangement flexibly supports accurate sewing of various kinds of applique cloths even if the user freely cuts the applique cloth or intentionally cuts the applique cloth with a different design. In some cases, various kinds of issues can occur in extraction of the outline. Examples of such issues include: an issue in that unnecessary lines are extracted; an issue in that the outline is transformed into a broken line or the like after the image processing; an issue in that the outline thus extracted is not configured as a closed loop; and an issue in that the stitching pattern deviates from the outline of the applique cloth thus extracted. The present embodiment allows the user to appropriately detect such issues. Furthermore, such an arrangement is capable of performing correction of such issues in a simple manner.

[Modification]

Figure 3:
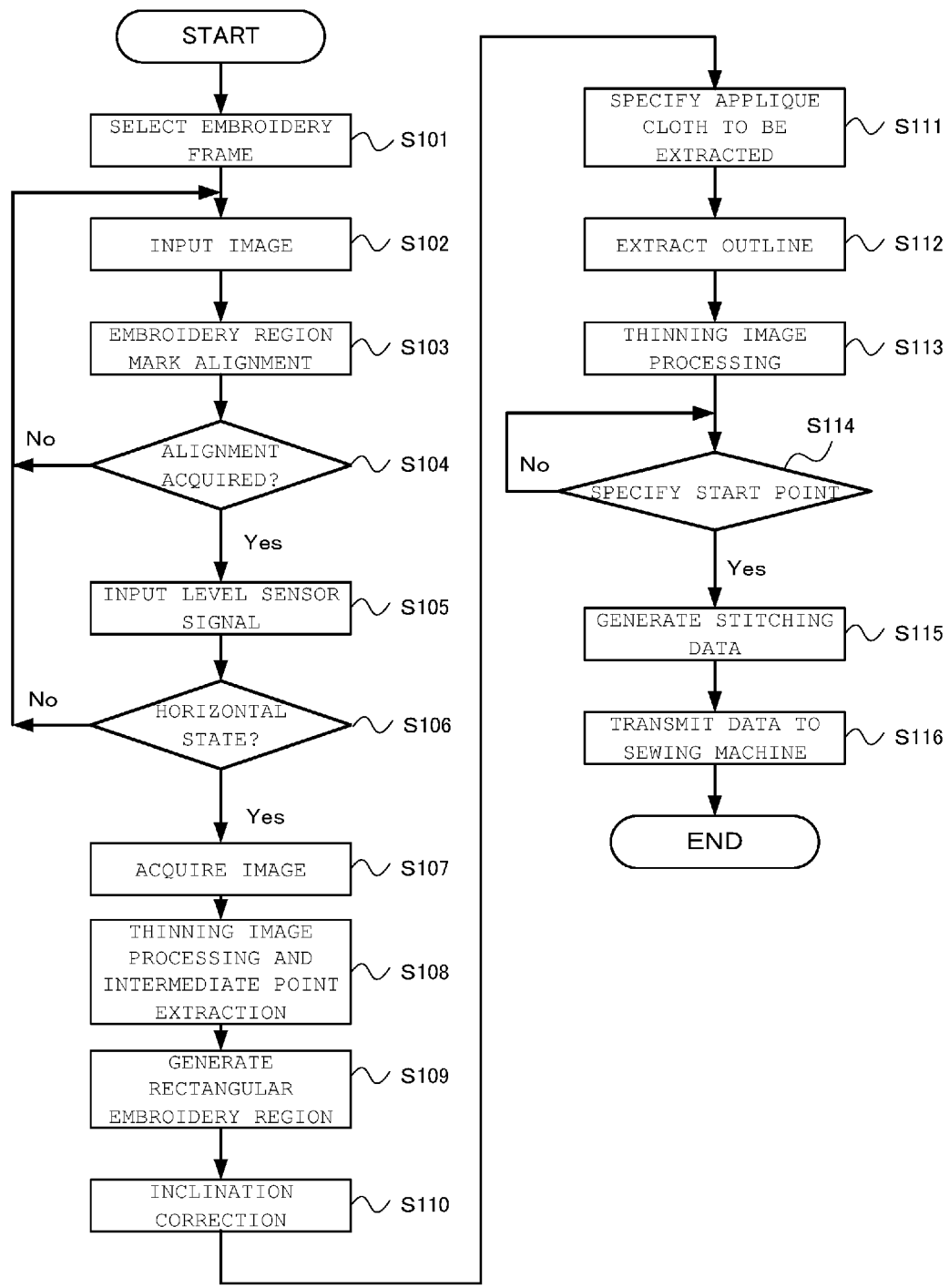
FIG. 3 is a diagram showing an electrical operation of the sewing system according to the first embodiment of the present invention.

Description has been made in the first and second embodiments regarding an example in which the operations represented by Steps S102 through S110 shown in FIG. 3 are executed in a state in which a base cloth mounting an applique cloth is mounted on the embroidery frame 110, for example. However, when the base cloth has a similar color or otherwise a similar pattern to that of the applique cloth, in some cases, an issue can occur in extraction of the outline data of the applique.

In order to address such an issue, in the present modification, in a state in which only the base cloth is mounted on the embroidery frame 110, image acquisition is performed after the operations represented by Steps S102 through S110 shown in FIG. 3 are executed, for example. The acquired image data (first acquired image data) thus obtained is stored. Next, in a state in which the base cloth mounting the applique cloth is mounted on the embroidery frame 110, image acquisition is performed after the operations represented by Steps S102 through S110 shown in FIG. 3 are executed, for example. The acquired image data (second acquired image data) thus obtained is stored.

The difference between the first acquired image data and the second acquired image data thus stored is calculated by means of image processing. When a weak line or a useless image that occurs due to image acquisition error is detected in the difference calculation, noise removal is performed in order to generate the outline data of the applique cloth. Also, such an arrangement may allow the user to specify the applique image so as to acquire the outline data of the applique. It should be noted that such an arrangement is capable of performing the magnification factor adjustment, rotation correction, and the like, for the acquired image data based on the multiple embroidery region marks provided to the embroidery frame 110. Thus, such an arrangement provides high reproducibility in size and position between the first acquired image data and the second acquired image data even if the user performs image acquisition using the tablet terminal held in the user's hands. Such an arrangement having such an advantage allows the outline data of the applique cloth to be generated with high precision based on the difference image data described above.

With the present modification, the difference between the first acquired image data and the second acquired image data is calculated. This allows the common image data in both the first acquired image data and the second acquired image data to be removed. Thus, such an arrangement is capable of accurately generating the outline data of the applique cloth even if the base cloth has a similar color or a similar pattern to that of the applique cloth.

Third Embodiment

Description has been made in the first and second embodiments for exemplary purposes regarding an arrangement in which the tablet terminal 10 configured as a sewing data generating apparatus generates the sewing data based on the outline data of the sewing target. Also, with another embodiment that differs from the aforementioned embodiments, an arrangement may be made in which the tablet terminal 10 generates the outline data of the sewing target, and the outline data thus generated is transmitted to the sewing machine 40. With such an arrangement, the sewing machine 40 may generate the sewing data for the sewing target based on the outline data thus received, and may perform a sewing operation for the sewing target according to the sewing data thus generated.

It should be noted that the operation of the sewing system or the sewing data generating apparatus may be recorded on a computer-system-readable or computer-readable recording medium in the form of a program. Also, such a program thus recorded may be read out and executed by the sewing system or the sewing data generating apparatus, thereby providing the sewing system or the sewing data generating apparatus according to the present invention. Examples of such a computer system or computer as used here include an operating system and a hardware component such as peripheral devices or the like.

Also, the "computer system" or "computer" encompasses website providing environments (or display environments) that employ the WWW (World Wide Web) system. Also, the aforementioned program may be transmitted to other computer systems or computers from a given computer system or computer that stores this program in its storage apparatus or the like via a transmission medium or otherwise transmission waves in the transmission medium. The "transmission medium" as used here to transmit a program represents a medium having a function of transmitting information, examples of which include networks (communication networks) such as the Internet and communication lines (communication wires) such as phone lines, etc.

Also, the aforementioned program may be configured to provide a part of the aforementioned function. Also, the aforementioned program may be configured as a so-called differential file (differential program), which is to be combined with a different program stored beforehand in a computer system in order to provide the aforementioned function.

Detailed description has been made with reference to the drawings regarding the embodiment according to the present invention. However, such a specific configuration is not restricted to the embodiment. Rather, various kinds of changes in design or the like may be made without departing from the scope of the present invention.

REFERENCE SIGNS LIST 10 tablet terminal (sewing data generating apparatus)
11 embroidery frame information acquisition unit
12 display unit
13 operation instructing unit
14 image acquisition unit
15 acquired image analyzing unit
16 embroidery region determination unit
18 outline data generating unit
19 sewing data generating unit
20 transmission unit
21 gravity direction detection unit
22 correction unit
23 apparatus-side control unit
25 sewing data confirmation unit
26 editing unit 40 sewing machine
41 sewing-machine-side display unit
42 reception unit
43 sewing-machine-side storage unit
44 sewing-machine-side control unit
45 embroidery frame identifying unit
46 transmission unit
47 sewing operation executing unit
60 base cloth
70 wireless LAN
80 USB memory
110 embroidery frame
111 inner frame
112 outer frame
113 center axis
114 embroidery region mark.

What is claimed is:

1. A sewing data generating apparatus comprising:
an embroidery frame information acquisition unit that acquires information with respect to an embroidery frame and information with respect to a mark alignment region displayed on a display unit for guiding a plurality of marks arranged at preset positions within the embroidery frame for defining an embroidery region of the embroidery frame;
an image acquisition unit that acquires an image of the embroidery frame and a sewing target mounted on a base cloth mounted on the embroidery frame when all the plurality of marks are aligned within the mark alignment region in an image displayed on the display unit;
an acquired image analyzing unit that performs image analysis for the plurality of marks in the image acquired by the image acquisition unit based on a correspondence with the information with respect to the embroidery frame acquired by the embroidery frame information acquisition unit;
an embroidery region determination unit that determines the embroidery region of the embroidery frame based on an analysis result obtained by the acquired image analyzing unit; and
an outline data generating unit that generates outline data of the sewing target based on the embroidery region thus determined.

2. The sewing data generating apparatus according to claim 1, comprising a sewing data generating unit that generates sewing data for the sewing target based on the outline data generated by the outline data generating unit.

3. The sewing data generating apparatus according to claim 2, comprising a transmission unit that transmits the sewing data, which is generated by the sewing data generating unit for the sewing target, to a sewing machine.

4. The sewing data generating apparatus according to claim 1, comprising an operation instructing unit that calls attention to inputting a positioning instruction for the embroidery frame such that the plurality of marks displayed on the display unit are all positioned within the mark alignment region.

5. The sewing data generating apparatus according to claim 4, wherein the operation instructing unit provides at least one from among a guidance display and an audio guidance.

6. The sewing data generating apparatus according to claim 1, comprising a gravity direction detection unit that detects a gravity direction,
wherein the display unit further displays an image acquisition orientation guidance display for guiding an alignment between an image acquisition optical axis of the image acquisition unit and the gravity direction based on a detection result obtained by the gravity direction detection unit.

7. The sewing data generating apparatus according to claim 6, wherein, when the plurality of marks are aligned within the mark alignment region and when judgment has been made based on the detection result obtained by the gravity direction detection unit that the image acquisition optical axis aligns with the gravity direction, the image acquisition unit automatically performs image acquisition.

8. The sewing data generating apparatus according to claim 7, comprising a correction unit configured such that, when there is an inclination between the display unit and the embroidery region thus determined in the image acquired by the image acquisition unit, the inclination is corrected.

9. The sewing data generating apparatus according to claim 1, wherein the acquired image analyzing unit performs thinning image processing on the image of the plurality of marks thus acquired,
and wherein the embroidery region determination unit determines the embroidery region based on the plurality of marks thus subjected to the thinning image processing.

10. The sewing data generating apparatus according to claim 2, comprising a sewing data confirmation unit that instructs the display unit to display an image of the sewing target acquired by the image acquisition unit and a planned sewing line generated based on the sewing data generated by the sewing data generating unit.

11. The sewing data generating apparatus according to claim 10, wherein the sewing data confirmation unit displays the planned sewing line in a color that can be easily identified visually with respect to colors in the image including the sewing target.

12. The sewing data generating apparatus according to claim 1, comprising an editing unit that edits the outline data according to an operation by a user.

13. A sewing data generating method comprising:
acquiring, by an embroidery frame information acquisition unit, information with respect to an embroidery frame and information with respect to a mark alignment region displayed on a display unit for guiding a plurality of marks arranged at preset positions within the embroidery frame for defining an embroidery region of the embroidery frame;
acquiring, by an image acquisition unit, an image of the embroidery frame and a sewing target mounted on a base cloth mounted on the embroidery frame when the plurality of marks displayed on the display unit are all positioned within the mark alignment region;
performing image analysis by an acquired image analyzing unit for the plurality of marks in the image acquired by the image acquisition unit based on a correspondence with the information with respect to the embroidery frame acquired by the embroidery frame information acquisition unit
determining, by an embroidery region determination unit, the embroidery region of the embroidery frame based on an analysis result obtained by the acquired image analyzing unit; and
generating, by an outline data generating unit, outline data of the sewing target based on the embroidery region thus determined.

14. A sewing system comprising a sewing data generating apparatus and a sewing machine, wherein the sewing data generating apparatus comprises:

an embroidery frame information acquisition unit that acquires information with respect to an embroidery frame and information with respect to a mark alignment region displayed on a display unit for guiding a plurality of marks arranged at preset positions within the embroidery frame for defining an embroidery region of the embroidery frame;

an image acquisition unit that acquires an image of the embroidery frame and a sewing target mounted on a base cloth mounted on the embroidery frame when all the plurality of marks are aligned within the mark alignment region in an image displayed on the display unit;

an acquired image analyzing unit that performs image analysis for the plurality of marks in the image acquired by the image acquisition unit based on a correspondence with the information with respect to the embroidery frame acquired by the embroidery frame information acquisition unit;

an embroidery region determination unit that determines the embroidery region of the embroidery frame based on an analysis result obtained by the acquired image analyzing unit;

an outline data generating unit that generates outline data of the sewing target based on the embroidery region thus determined; and a transmission unit that transmits, to the sewing machine, the outline data generated by the outline data generating unit or otherwise the sewing data for the sewing target generated based on the outline data, and wherein the sewing machine comprises:

a reception unit that receives the outline data or otherwise the sewing data transmitted from the transmission unit; and a sewing operation executing unit that executes a sewing operation for the outline of the sewing target according to the outline data or otherwise the sewing data received by the reception unit.

\* \* \* \* \*